US010382758B2

(12) United States Patent
Han et al.

(10) Patent No.: US 10,382,758 B2
(45) Date of Patent: Aug. 13, 2019

(54) TRANSFORM BLOCK-LEVEL SCAN ORDER SELECTION FOR VIDEO CODING

(71) Applicant: GOOGLE LLC, Mountain View, CA (US)

(72) Inventors: Jingning Han, Santa Clara, CA (US); Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 20 days.

(21) Appl. No.: 15/880,939

(22) Filed: Jan. 26, 2018

(65) Prior Publication Data

US 2019/0191164 A1 Jun. 20, 2019

Related U.S. Application Data

(60) Provisional application No. 62/599,325, filed on Dec. 15, 2017.

(51) Int. Cl.
*H04N 7/12* (2006.01)
*H04N 11/02* (2006.01)
(Continued)

(52) U.S. Cl.
CPC ......... *H04N 19/129* (2014.11); *H04N 19/176* (2014.11); *H04N 19/18* (2014.11); *H04N 19/61* (2014.11); *H04N 19/82* (2014.11)

(58) Field of Classification Search
CPC .................................................... H04N 19/129
See application file for complete search history.

(56) References Cited

U.S. PATENT DOCUMENTS 8,428,133 B2   4/2013  Ye et al.
8,824,557 B2   9/2014  Srinivasan
(Continued)

FOREIGN PATENT DOCUMENTS

WO   2008/157431 A2   12/2008
WO   2014/028530 A1   2/2014

OTHER PUBLICATIONS

International Search Report and Written Opinion in PCT/US2018/051036, dated Feb. 12, 2019, 10 pgs.
(Continued)

*Primary Examiner* — Rebecca A Volentine
(74) *Attorney, Agent, or Firm* — Young Basile Hanlon & MacFarlane, P.C.

(57) ABSTRACT

A scan order for encoding or decoding coefficients of a transform block is selected on a transform block-level. A set of candidate scan orders is processed by identifying end of block positions within the transform block for each of the candidate scan orders. Cost values are determined for each of the candidate scan orders to reflect a number of the coefficients of the transform block that are located before the respective end of block positions. In particular, a cost value for a candidate scan order reflects the number of zero-value coefficients located before the end of block position for that candidate scan order. One of the candidate scan orders is then selected based on those cost values. The selected scan order is used to scan the coefficients in the transform block, such as for encoding those coefficients to a bitstream or for decoding those coefficients to an output video stream.

20 Claims, 10 Drawing Sheets

(51) Int. Cl.
*H04N 11/04* (2006.01)
*H04N 19/129* (2014.01)
*H04N 19/61* (2014.01)
*H04N 19/82* (2014.01)
*H04N 19/176* (2014.01)
*H04N 19/18* (2014.01)

(56) References Cited

U.S. PATENT DOCUMENTS

| | | | | |
|---|---|---|---|---|
| 2008/0310504 | A1* | 12/2008 | Ye | H04N 19/197 375/240.02 |
| 2010/0124284 | A1* | 5/2010 | Lee | H04N 19/139 375/240.18 |
| 2011/0206135 | A1* | 8/2011 | Drugeon | H04N 19/176 375/240.24 |
| 2012/0099646 | A1* | 4/2012 | Coban | H04N 19/176 375/240.12 |
| 2012/0230417 | A1 | 9/2012 | Sole Rojals et al. | |
| 2012/0236931 | A1* | 9/2012 | Karczewicz | H04N 19/132 375/240.02 |
| 2013/0070843 | A1* | 3/2013 | Srinivasan | H04N 19/13 375/240.02 |
| 2013/0294507 | A1* | 11/2013 | Song | H04N 19/129 375/240.12 |
| 2016/0029028 | A1* | 1/2016 | Pu | H04N 19/176 375/240.24 |
| 2018/0160114 | A1* | 6/2018 | Philippe | H04N 19/129 |

OTHER PUBLICATIONS

Sun et al. "An Adaptive Coefficient Scanning Scheme for Inter-Prediction Coding"; Institute of Information and Communication Engineering, Zhejiang University Hangzhou, 310027, China; 2007; p. 1-4.

* cited by examiner

TRANSFORM BLOCK-LEVEL SCAN ORDER SELECTION FOR VIDEO CODING

CROSS REFERENCE TO RELATED APPLICATION(S)

This disclosure claims the benefit of U.S. Provisional Application No. 62/599,325, filed Dec. 15, 2017, the disclosure of which is hereby incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for decoding a current transform block according to a scan order selected based on transform coefficients of a previously decoded transform block according to an implementation of this disclosure comprises identifying, as a first end of block position, a location within the previously decoded transform block of a last non-zero one of the transform coefficients according to a first candidate scan order. The method further comprises identifying, as a second end of block position, a location within the previously decoded transform block of a last non-zero one of the transform coefficients according to a second candidate scan order. The method further comprises determining a cost value for the first candidate scan order based on a number of the transform coefficients that are located before the first end of block position. The method further comprises determining a cost value for the second candidate scan order based on a number of the transform coefficients that are located before the second end of block position. The method further comprises selecting, based on the cost value for the first candidate scan order and the cost value for the second candidate scan order, one of the first candidate scan order or the second candidate scan order as the scan order for decoding the current transform block. The method further comprises decoding the current transform block using the selected scan order.

An apparatus for decoding a current transform block according to a scan order selected based on transform coefficients of a previously decoded transform block according to an implementation of this disclosure comprises a memory and a processor configured to execute instructions stored in the memory. The instructions include instructions to identify, as a first end of block position, a location within the previously decoded transform block of a last non-zero one of the transform coefficients according to a first candidate scan order. The instructions further include instructions to identify, as a second end of block position, a location within the previously decoded transform block of a last non-zero one of the transform coefficients according to a second candidate scan order. The instructions further include instructions to determine a cost value for the first candidate scan order based on a number of the transform coefficients that are located before the first end of block position. The instructions further include instructions to determine a cost value for the second candidate scan order based on a number of the transform coefficients that are located before the second end of block position. The instructions further include instructions to select, based on the cost value for the first candidate scan order and the cost value for the second candidate scan order, one of the first candidate scan order or the second candidate scan order as the scan order for decoding the current transform block. The instructions further include instructions to decode the current transform block using the selected scan order.

A method for decoding a current transform block according to an implementation of this disclosure comprises identifying a first number of zero-value transform coefficients located before a last non-zero coefficient of a previously decoded transform block according to a first candidate scan order. The method further comprises identifying a second number of zero-value transform coefficients located before a last non-zero coefficient of the previously decoded transform block according to a second candidate scan order. The method further comprises determining that the first number of zero-value transform coefficients is less than the second number of zero-value transform coefficients. The method further comprises, responsive to determining that the first number of zero-value transform coefficients is less than the second number of zero-value transform coefficients, decoding the current transform block using the first candidate scan order.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
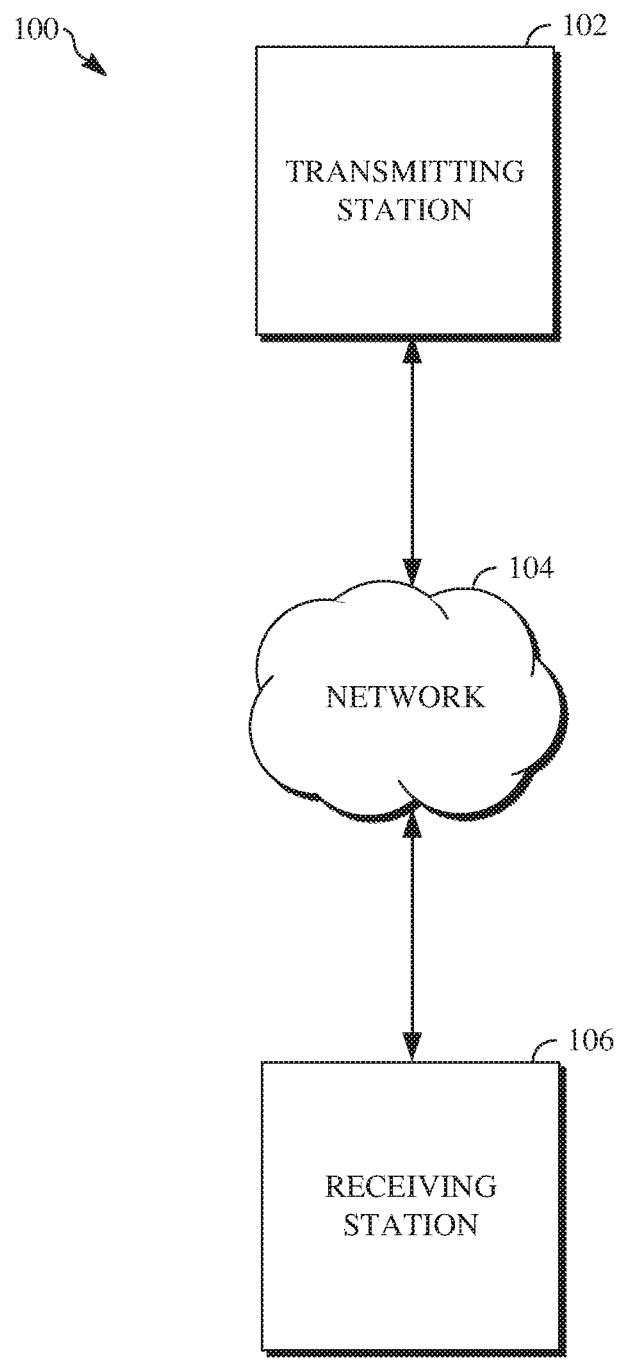
FIG. 1 is a schematic of a video encoding and decoding system.

Video compression schemes may include encoding a video stream by breaking each image, or frame, of a video sequence into smaller portions, such as blocks, and generating an output bitstream using techniques to limit the information included for each block in the output. An encoded bitstream can be decoded to re-create the blocks and the source images from the limited information. Typical video compression and decompression techniques for encoding a video stream or decoding an encoded bitstream include coding quantized transform coefficients in a transform block according to a scan order. The scan order converts a two-dimensional array of quantized transform coefficients (e.g., from the transform block, which is a two-dimensional planar rectangle), into a one-dimensional sequence. The coefficients are then processed according to their order in the one-dimensional sequence.

There may be a number of scan orders available for scanning coefficients to be encoded or decoded. For example, a scan order may scan the transform block on a row-by-row basis starting at the top of the transform block (e.g., raster or horizontal scan) or on a column-by-column basis starting at the left side of the transform block (e.g., vertical scan). In another example, the scan order may process the coefficients in directions that are not exactly horizontal or vertical (e.g., diagonal scan, zig-zag scan, etc.). Certain scan orders may in some cases be more optimal for use in encoding or decoding coefficients than others. For example, a transform block may end with a run of zeros. In such a case, an end of block position is coded to signal that all coefficients following that end of block position are zero-value coefficients. However, the location of the end of block position depends on the scan order used. This is because the patterns for scanning the coefficients in the transform block differ between the scan orders, and some patterns will locate a last non-zero coefficient sooner than others. The efficiency of an encoder or decoder is improved through the use of a scan order that maximizes the number of zero-value coefficients located after an end of block position in a transform block.

One solution for using such a scan order includes processing a superblock (e.g., a 64×64 block within a frame) by identifying each non-zero coefficient in each transform block of left and above neighbor superblocks. For each of those non-zero coefficients, the values of nearby coefficients (e.g., to the left or above a current non-zero coefficient in the same transform block) are processed and aggregated to determine the locations of the non-zero coefficients with respect to other non-zero coefficients in the transform block. The values for each non-zero coefficient in each transform block are aggregated according to directions and then weighted according to relative strengths of the directions. The direction having the lowest weighted aggregated value can then be selected. However, that solution is complicated in that it requires processing of coefficients at the superblock-level, and it is burdensome on an encoder or a decoder because it requires that all non-zero coefficients in all transform blocks of neighbor superblocks be processed to select a scan order for a current superblock. Furthermore, that solution requires that the scan order ultimately selected for the current superblock be used to scan the coefficients in all transform blocks of the current superblock.

Implementations of this disclosure include systems and techniques for the transform block-level selection of a scan order. A set of candidate scan orders is processed by identifying end of block positions within the transform block for each of the candidate scan orders. Cost values are determined for each of the candidate scan orders to reflect a number of the coefficients of the transform block that are located before the respective end of block positions. In particular, a cost value for a candidate scan order reflects the number of zero-value coefficients located before the end of block position for that candidate scan order. One of the candidate scan orders is then selected based on those cost values. The selected scan order is used to scan the coefficients in the transform block, such as for encoding those coefficients to a bitstream or for decoding those coefficients to an output video stream. In some implementations, the selection of the scan order may include processing cost values for, or ranks of, the candidate scan orders for neighbor transform blocks of the current transform block (e.g., within the same block, superblock, etc.).

Further details of techniques for transform block-level scan order selection are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
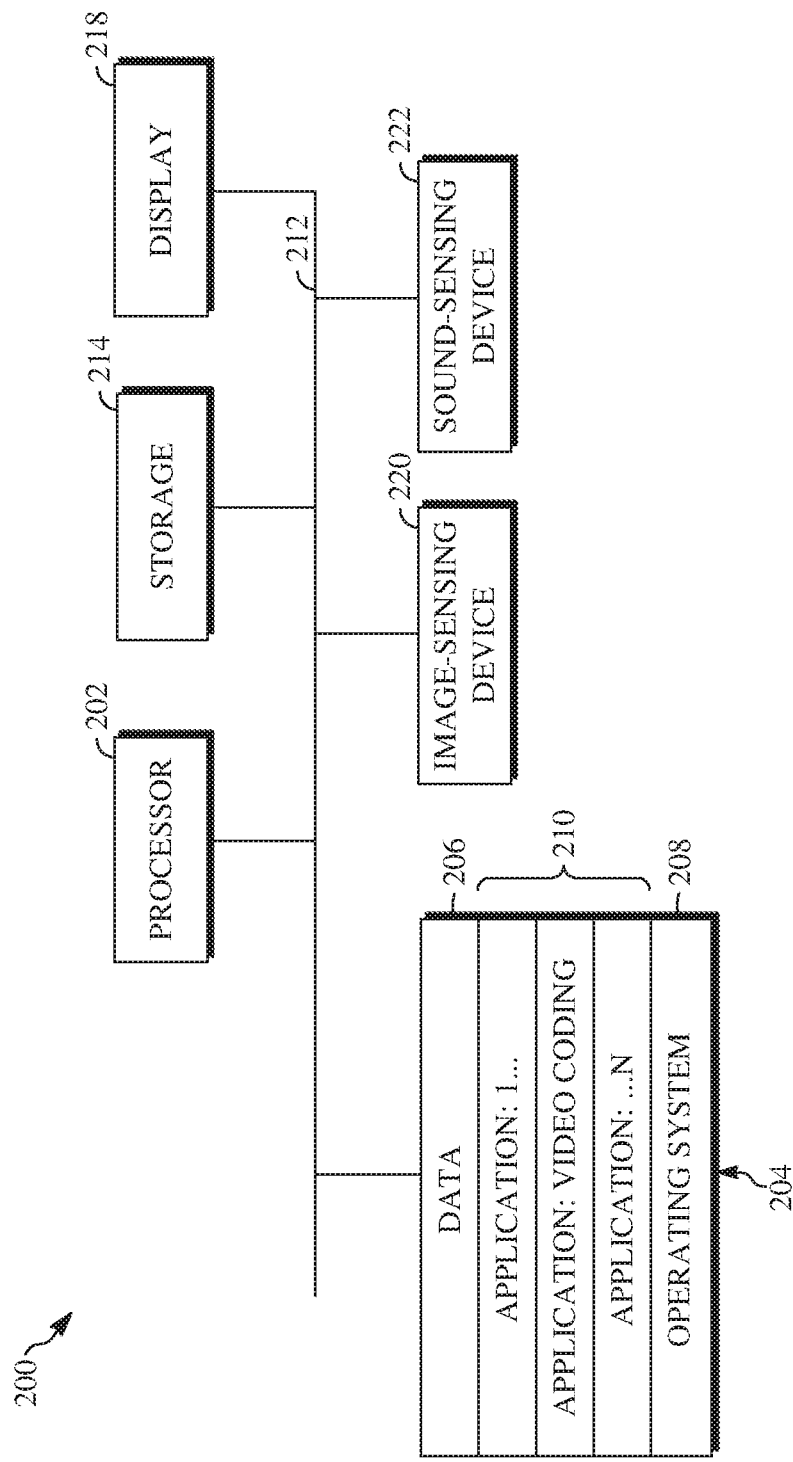
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
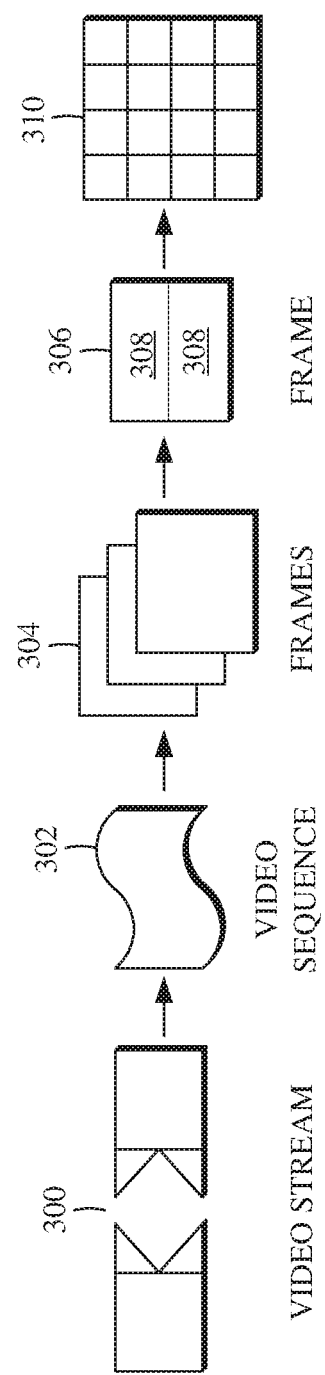
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
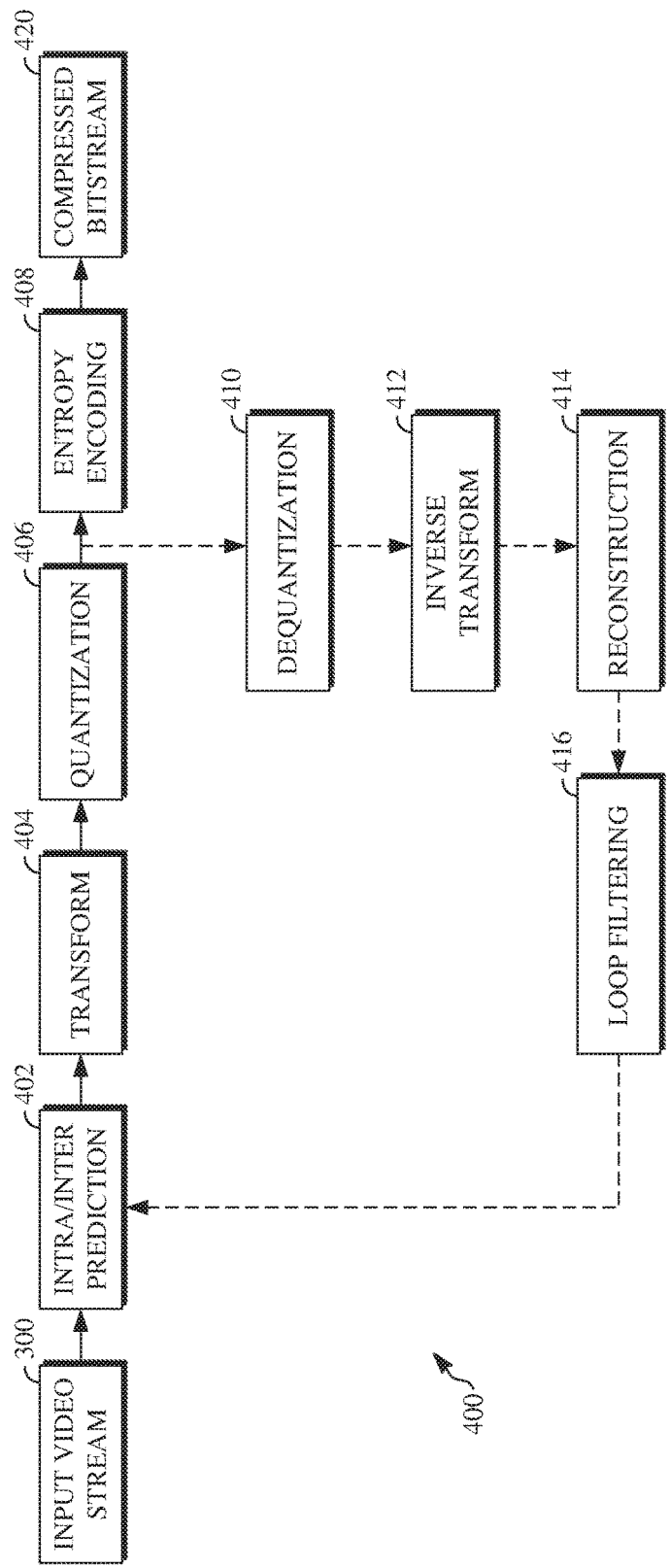
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual or prediction residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
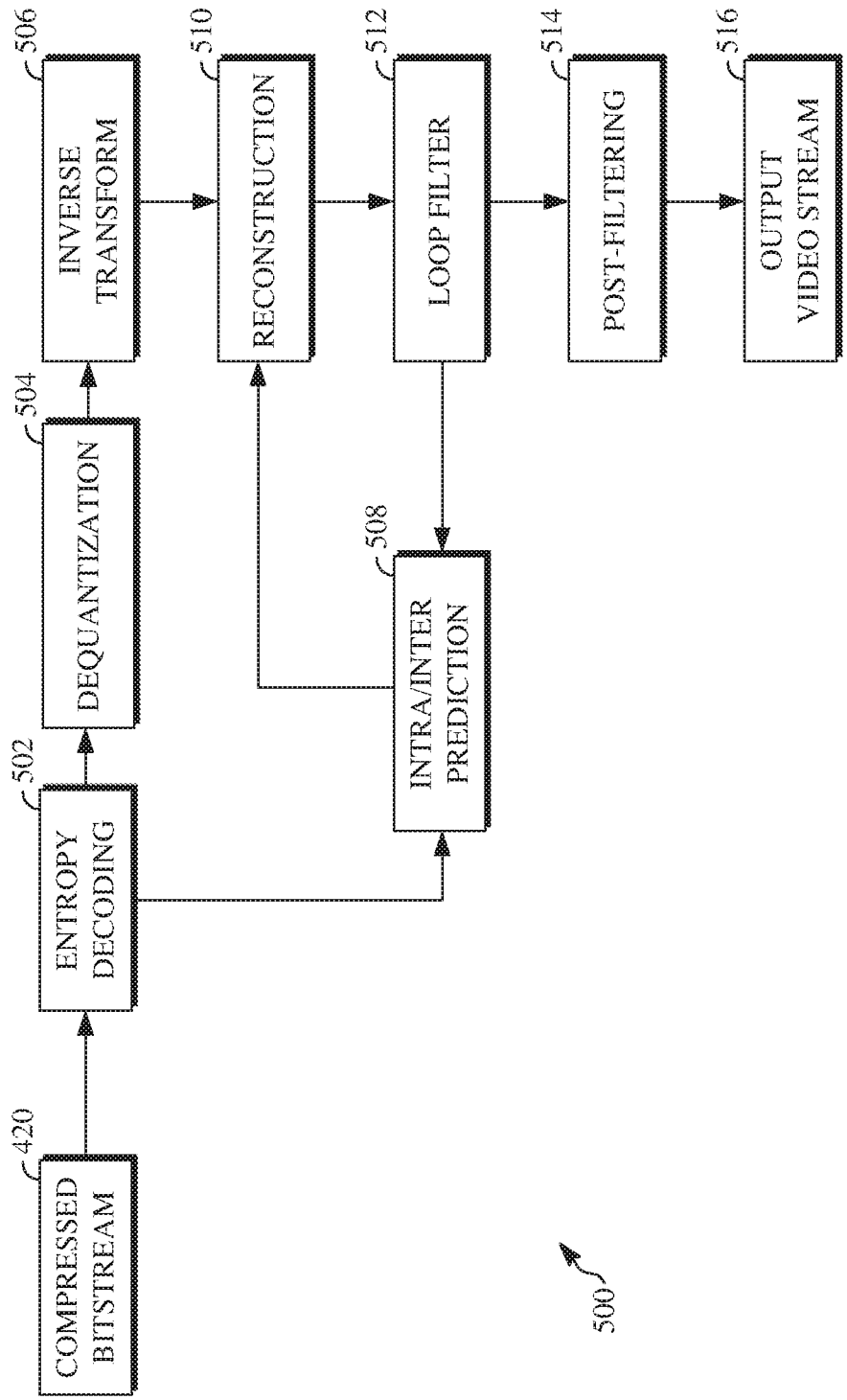
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and an optional post-filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts (e.g., using deblocking filtering, sample adaptive offset filtering, or the like, or a combination thereof). Other filtering can be applied to the reconstructed block. In this example, the post-filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the post-filtering stage 514.

Figure 6:
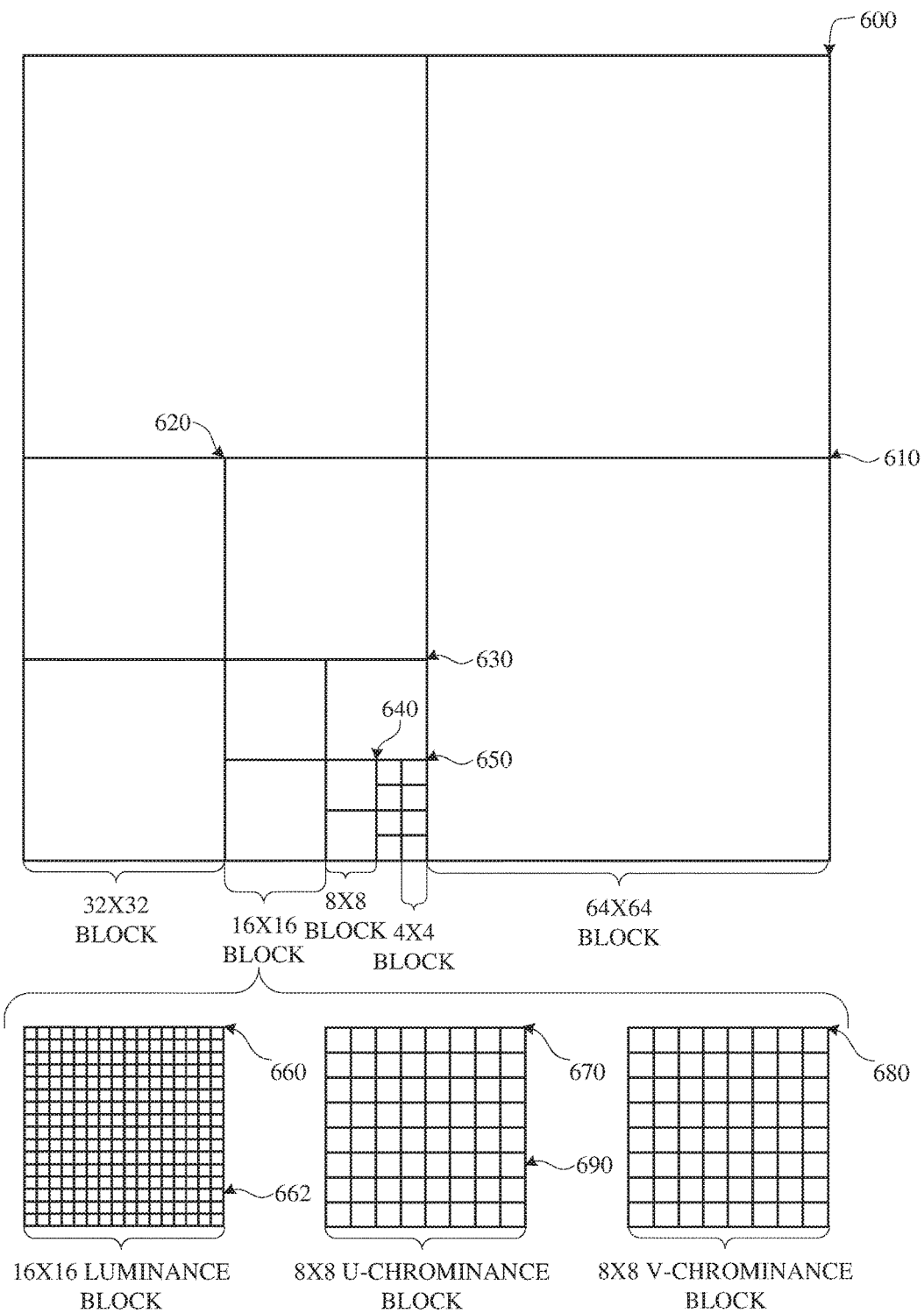
FIG. 6 is a block diagram of a representation of a portion of a frame according to implementations of this disclosure.

FIG. 6 is a block diagram of a representation of a portion 600 of a frame, such as the frame 304 shown in FIG. 3, according to implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform stage 404 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a predictor to use for encoding a current block or pixel of the current frame with maximal efficiency. For example, the search may identify a portion of the reference frame for which the difference in pixel values between the current block and a prediction block generated based on the portion of the reference frame is minimized, and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a predictor may include calculating a cost function, such as a sum of absolute differences (SAD), between the pixels of portions of the search area and the pixels of the current block.

In some implementations, the spatial difference between the location of the portion of the reference frame for generating a predictor in the reference frame and the current block in the current frame may be represented as a motion vector. The difference in pixel values between the predictor block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into four partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
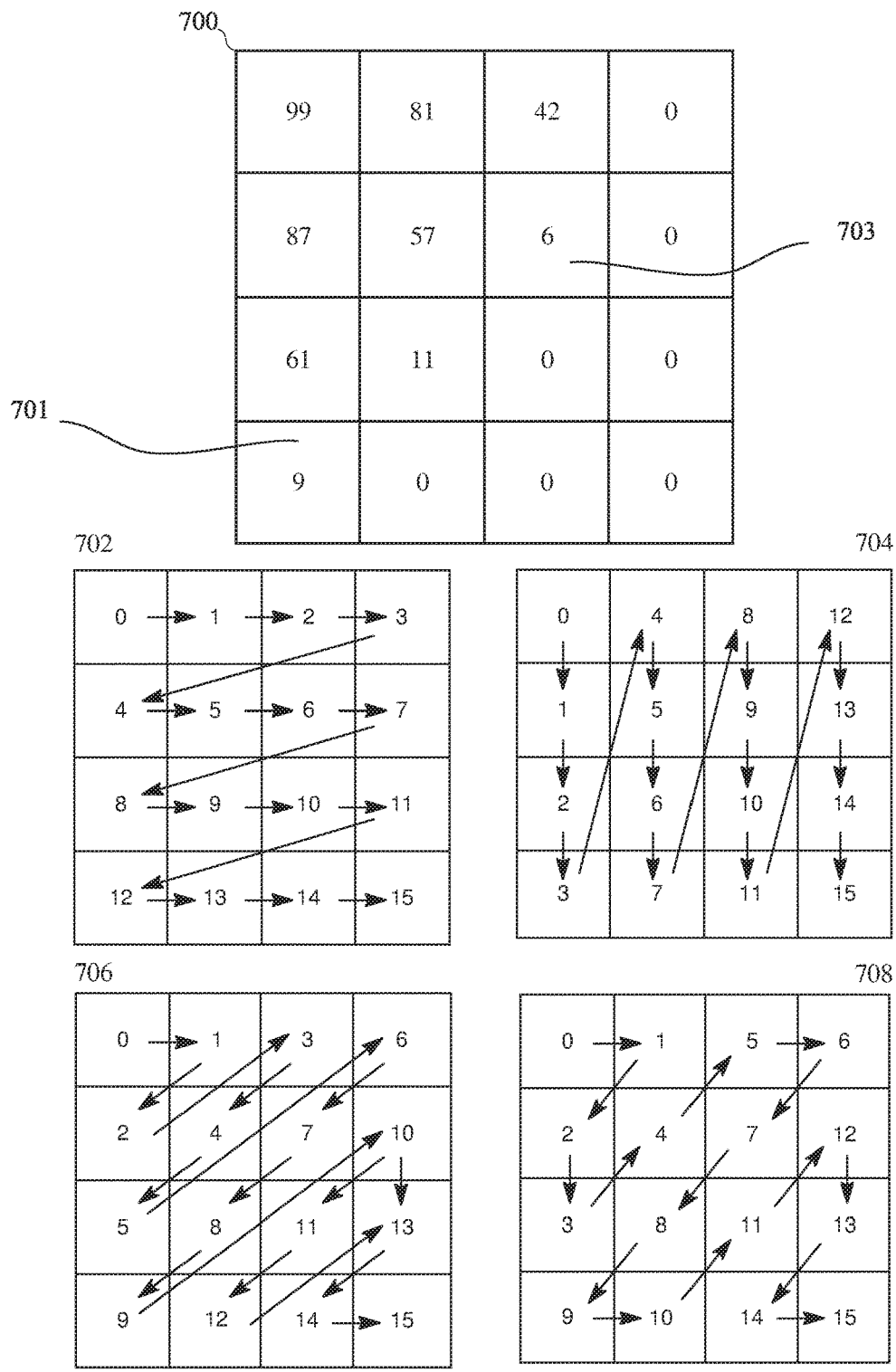
FIG. 7 shows diagrams of an example of a transform block and examples of scan orders for encoding or decoding the transform block according to implementations of this disclosure.

FIG. 7 shows diagrams of an example of a transform block 700 and examples of scan orders 702-708 for encoding or decoding the transform block 700 according to implementations of this disclosure. In some implementations, an element of an encoder, such as the transform unit stage 404 of the encoder 400 shown in FIG. 4, may generate the transform block 700. In some implementations, an element of an encoder, such as the quantization stage 406 of the encoder 400 shown in FIG. 4, may quantize the transform block 700 to generate a quantized transform block. As used herein, unless otherwise expressly indicated, the term "transform block" may refer to a block, matrix, or other data structure, of transform coefficients or quantized transform coefficients. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In the transform block 700 shown in FIG. 7, the value shown in each location indicates the transform coefficient value for the respective location. For clarity, the location of a transform coefficient for a block may be referred to as the "position," "location," or variations thereof, of the transform coefficient. As used herein references to "proximity," "spatial proximity," or "distance" between transform coefficients may indicate proximity or distance in the transform coefficient matrix representation of the transform coefficients for a block.

Some of the coefficients in the transform block 700 are non-zero coefficients, such as those that do not have a value of "0." Others of the coefficients in the transform block 700 are zero-value coefficients, such as those that have a value of "0." In some implementations, the transform block 700 may be processed in a scan order to improve entropy coding efficiency. For example, the scan order may tend to group zero value coefficients at the end of the block and consecutive zero value coefficients at the end of a block in scan order (i.e., the zero coefficient tail) may be omitted from the output bitstream without loss of data.

In some implementations, coding coefficients of a transform block 700 may include encoding those coefficients in a scan order, such as a horizontal scan order 702, a vertical scan order 704, a diagonal scan order 706, or a zig-zag scan order 708. The values shown in each block of a scan order represent the order that the corresponding coefficient is entropy coded. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

Depending on the scan order used, one of the non-zero coefficients will be a last non-zero coefficient scanned using the scan order. For example, when the horizontal scan order 702 is used, the coefficient 701 of the transform block 700 is the last non-zero coefficient. The end of block position in the transform block 700 for the horizontal scan order 702 is thus identified as the location of the coefficient 701. In another example, when the vertical scan order 704 is used, the coefficient 703 of the transform block 700 is the last non-zero coefficient. The end of block position in the transform block 700 for the vertical scan order 704 is thus identified as the location of the coefficient 703.

In some implementations, encoding the coefficients of a transform coefficient matrix in a scan order may include generating a one dimensional array, such as a vector, of the transform coefficients by including each transform coefficient in the vector in scan order. For example, the DC coefficient, which may be the coefficient in the top left corner of the transform coefficient matrix may be the first element of the scan order vector, may have a transform coefficient matrix location of (0,0) and may have a scan order position of (0).

As used herein, the terms "order," "scan position," "vector position," or variations thereof of a transform coefficient indicate a relative position, or index, of the transform coefficient in the scan order or the scan order vector. Although FIG. 7 shows examples of sequential scan patterns, the coefficients may be coded using a non-contiguous scan pattern.

Figure 8:
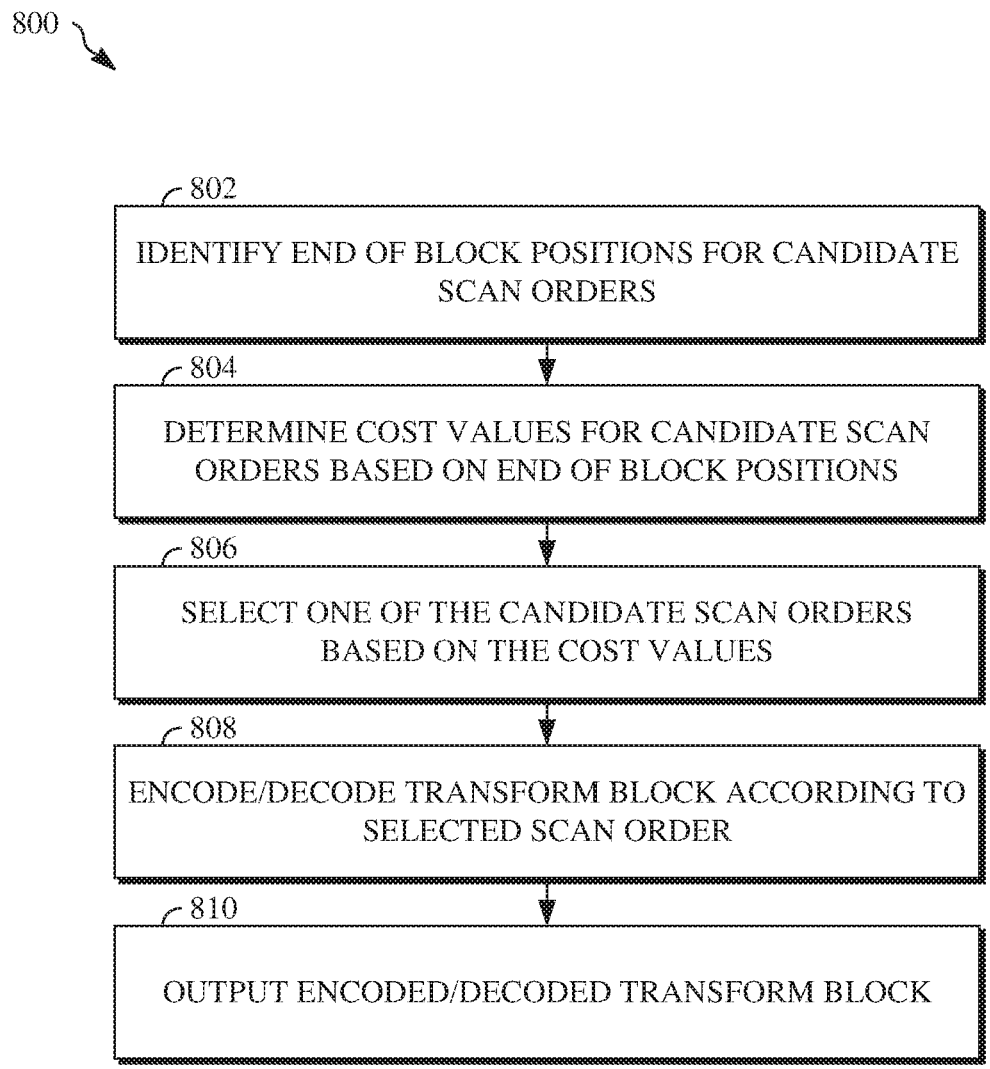
FIG. 8 is a flowchart diagram of an example of a technique for selecting a scan order for encoding or decoding a transform block.
Figure 9:
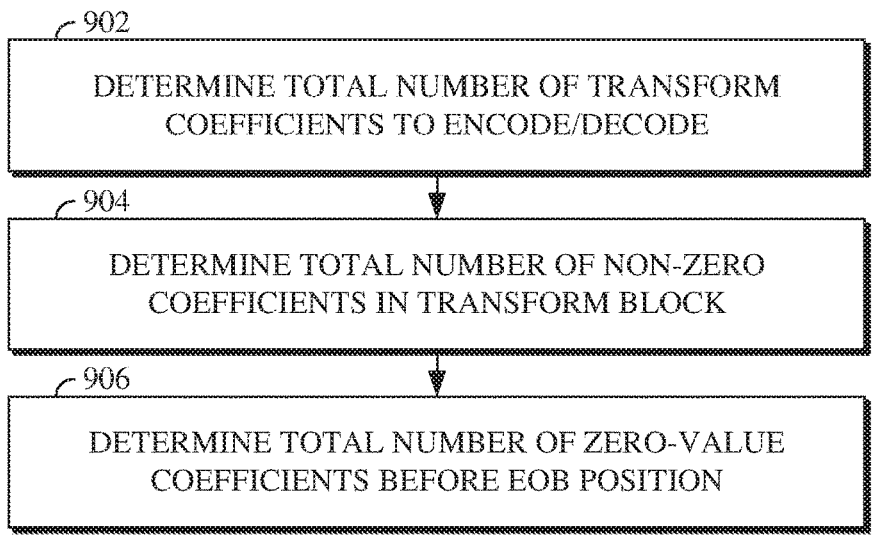
FIG. 9 is a flowchart diagram of an example of a technique for determining a number of zero-value coefficients before an end of block position in a transform block.
Figure 10:
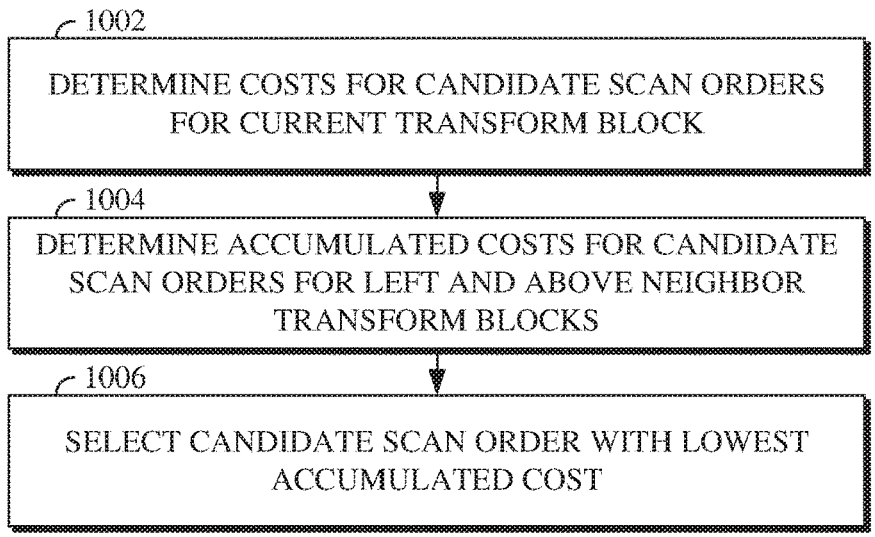
FIG. 10 is a flowchart diagram of an example of a technique for using accumulated cost values for neighbor transform blocks to select a scan order.

Techniques for encoding or decoding video frames are now described with respect to FIGS. 8-10. FIG. 8 is a flowchart diagram of an example of a technique 800 for selecting a scan order for encoding or decoding a transform block. FIG. 9 is a flowchart diagram of an example of a technique 900 for determining a number of zero-value coefficients before an end of block position in a transform block. FIG. 10 is a flowchart diagram of an example of a technique 1000 for using accumulated cost values for neighbor transform blocks to select a scan order.

One or more of the technique 800, the technique 900, or the technique 1000 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform one or more of the technique 800, the technique 900, or the technique 1000. One or more of the technique 800, the technique 900, or the technique 1000 can be implemented using specialized hardware or firmware. As explained above, some computing devices may have multiple memories or processors, and the operations described in one or more of the technique 800, the technique 900, or the technique 1000 can be distributed using multiple processors, memories, or both.

For simplicity of explanation, the technique 800, technique 900, and the technique 1000 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, a flowchart diagram of an example of the technique 800 for selecting a scan order for encoding or decoding a transform block is shown. At 802, end of block positions are identified for each candidate scan order of a set of candidate scan orders. The end of block position for a given candidate scan order represents a location within the transform block of a last non-zero transform coefficient according to that candidate scan order. For example, the set of candidate can orders can include a first candidate scan order and a second candidate scan order. A first end of block position can be identified as a location within the transform block of a last non-zero one of the transform coefficients according to a first candidate scan order, and a second end of block position can be identified as a location within the transform block of a last non-zero one of the transform coefficients according to a second candidate scan order.

A location of an end of block position within a transform block refers to an index of a last non-zero coefficient of the transform block in a one-dimensional sequence of the transform coefficients of the transform block. For example, a candidate scan order can convert the transform coefficients of the transform block from a two-dimensional array to a one-dimensional sequence. The order of the transform coefficients in that one-dimensional sequence reflects the order in which those transform coefficients were processed according to the candidate scan order. Based on the particular type of a candidate scan order, the index of the last non-zero coefficient (e.g., the location of the end of block position) may be earlier or later in the one-dimensional sequence.

Identifying the end of block position for a candidate scan order can include determining to encode or decode (as applicable based on whether the transform block is being encoded or decoded by performing the technique 800) a particular number of the transform coefficients of the transform block based on the candidate scan order. That particular number of the transform coefficients includes non-zero transform coefficients and zero-value transform coefficients to be encoded or decoded. More specifically, that particular number of transform coefficients includes all of the non-zero transform coefficients of the transform block and each of the zero-value transform coefficients of the transform block that is located before the last non-zero coefficient. Implementations and examples for determining a number of transform coefficients to encode or decode are described below with respect to FIG. 9.

At 804, cost values are determined for the candidate scan orders based on the end of block positions. For example, a cost value can be determined for the first candidate scan order described above based on a number of the transform coefficients that are located before the end of block position for that first candidate scan order, and a cost value can be determined for the second candidate scan order described above based on a number of the transform coefficients that are located before the end of block position for that second candidate scan order.

The cost value for a candidate scan order is determined based on a number of zero-value coefficients located within the transform block before an end of block position of the candidate scan order. As such, a candidate scan order having an end of block position that is earlier in a one-dimensional sequence of the transform coefficients will have a lower cost value than a candidate scan order having an end of block position that is later in that one-dimensional sequence. Implementations and examples for determining a number of zero-value coefficients before an end of block position in a transform block are described below with respect to FIG. 9.

At 806, one of the candidate scan orders is selected based on the cost values. The selection can include selecting a lowest one of the cost values. For example, where the set of candidate scan orders includes the first candidate scan order and the second candidate scan order described above, one of the first candidate scan order or the second candidate scan order is selected as the scan order for encoding or decoding the transform block based on the cost value for the first candidate scan order and the cost value for the second candidate scan order.

For example, selecting one of the first candidate scan order or the second candidate scan order can include determining whether the cost value for the first candidate scan order is less than the cost value for the second candidate scan order. Responsive to determining that the cost value for the first candidate scan order is less than the cost value for the second candidate scan order, the first candidate scan order is selected as the scan order for encoding or decoding the transform block. However, responsive to determining that the cost value for the first candidate scan order is greater than the cost value for the second candidate scan order (e.g., or otherwise that the cost value for the second candidate scan order is less than the cost value for the first candidate scan order), the second candidate scan order is selected as the scan order for encoding or decoding the transform block.

Alternatively, selecting the candidate scan order may include more than simply determining which of the candidate scan orders has a lowest cost value. For example, the set of candidate scan orders can include the first and second candidate scan values described above as well as third and fourth candidate scan values. The first and second candidate scan values may scan the transform coefficients of the transform block according to the same angle, but in a different direction. For example, the first candidate scan order can have a 45 degree diagonal direction from bottom-left to top-right, and the second candidate scan order can have a 45 degree diagonal direction from top-right to bottom-left. A cost value may not be determined for both of the first candidate scan order and the second candidate scan order. Rather, the first and second candidate scan orders may share a common cost value.

Selecting one of the candidate scan orders may thus include determining that the first candidate scan order has a lowest cost value of the set of candidate scan orders. In such a case, one of the first candidate scan order or the second candidate scan order will be selected. Determining which of the first or second candidate scan orders to select can include determining whether the third candidate scan order has a greater cost value than the fourth candidate scan order. For example, the third and fourth candidate scan orders have different cost values because they process the transform coefficients of the transform block in a different order. The different orders corresponding to the third and fourth candidate scan orders can indicate whether a bottom-left to top-right direction or a top-right to bottom-left direction is more optimal.

As such, responsive to determining that the third candidate scan order has a greater cost value than the fourth candidate scan order, the first candidate scan order is selected as the scan order for encoding or decoding the transform block. However, responsive to determining that the third candidate scan order has a cost value that is equal to or less than a cost value of the fourth candidate scan order, the second candidate scan order is selected as the scan order for encoding or decoding the transform block.

At 808, the transform block is encoded or decoded according to the selected scan order. For example, the transform block can be encoded or decoded by scanning the transform coefficients according to the selected scan order. At 810, the encoded or decoded transform block is output to an output element. For example, during an encoding operation, the encoded transform block is output to a bitstream, such as which may later be decoded. In another example, during a decoding operation, the decoded transform block is output for further processing by a decoder and then to an output video stream, such as which may be displayed on a computing device of a receiving station (e.g., the computing device 200 shown in FIG. 2 and the receiving station 106 shown in FIG. 1).

In some implementations, the technique 800 can include determining cost values for at least some of the candidate scan orders based on transform coefficients of neighbor transform blocks of the transform block. Those cost values determined based on the transform coefficients of the neighbor transform blocks can then be used to select a scan order for encoding or decoding the transform block. For example, the cost values determined for the candidate scan orders based on the transform coefficients of the neighbor transform blocks can be accumulated to produce accumulated cost values. In such an implementation, selecting the scan order for encoding or decoding the transform block can include determining that one of the candidate scan orders has a lowest accumulated cost value of the accumulated cost values and selecting that candidate scan order as the scan order for encoding or decoding the transform block.

In another example, the cost values determined for the candidate scan orders based on the transform coefficients of the neighbor transform blocks can be ranked and accumulated to produce accumulated ranks. In such an implementation, selecting the scan order for encoding or decoding the transform block can include determining that one of the candidate scan orders has a lowest (e.g., closest to "1" when the ranks are expressed as numbers) accumulated rank of the accumulated ranks and selecting that candidate scan order as the scan order for encoding or decoding the transform block. Implementations and examples for using accumulated cost values or accumulated ranks for neighbor transform blocks to select a scan order are described below with respect to FIG. 10.

Referring next to FIG. 9, a flowchart diagram of an example of the technique 900 for determining a number of zero-value coefficients before an end of block position in a transform block is shown. At 902, a total number of transform coefficients to be encoded or decoded is determined. The total number of transform coefficients represents the number of transform coefficients that are located before the end of block position according to a given candidate scan order. The total number of transform coefficients includes non-zero coefficients and non-zero coefficients.

At 904, a total number of non-zero coefficients in the transform block is determined. The total number of non-zero coefficients in the transform block is the same for each candidate scan order because each candidate scan order has to scan each non-zero coefficient before an end of block position for the candidate scan order can be identified.

At 906, a total number of zero-value coefficients located within the transform block and before the end of block position in the transform block is determined. Determining the total number of zero-value coefficients located within the transform block and before the end of block position includes calculating a difference between the total number of transform coefficients to be encoded or decoded and the total number of non-zero coefficients in the transform block.

The technique 900 may, for example, be performed using the following pseudocode, in which a cost value for a candidate scan order reflects the total number of zero-value coefficients located within the transform block and before the end of block position for that candidate scan order:

initialize scan_cost as array of size S to all 0
determine nnz // number of non-zero coefficients in the transform block
for each i in {0, 1, . . . , S−1}: // for each candidate scan order in a set of S>1 scan orders
    determine eob[i] // number of coefficients to be encoded/decoded scan_cost[i]=eob[i]−nnz // cost value Therefore, the cost value for a given candidate scan order is positively correlated with the total number of zero-value coefficients located within the transform block and before the end of block position for that candidate scan order.

In some implementations, the pseudocode may differ based on the implementations of the technique 900. For example, the set of candidate scan orders may include more or fewer than six candidate scan orders.

Referring next to FIG. 10, a flowchart diagram of an example of the technique 1000 for using accumulated cost values for neighbor transform blocks to select a scan order is shown. At 1002, costs for candidate scan orders are determined for the current transform block. For example, the costs can be the cost values determined as described with respect to the technique 800 shown in FIG. 8. At 1004, accumulated costs for candidate scan orders for left and above neighbor transform blocks of the current transform block are determined. For example, there may be one or more left neighbor transform blocks of the current transform block. In another example, there may be one or more above neighbor transform blocks of the current transform block. In yet another example, there may be a combination of left and above neighbor transform blocks of the current transform block.

Accumulating the costs for the candidate scan orders for the left and above neighbor transform blocks includes determining cost values for each candidate scan order for each neighbor transform block and then adding the cost values for the same candidate scan orders together to produce accumulated costs. For example, a cost value for a first candidate scan order of a left neighbor transform block may be 1 and a cost value for the same first candidate scan order of an above neighbor transform block may be 2. The accumulated cost for that first candidate scan order would thus be 3. At 1006, a candidate scan order with a lowest accumulated cost is selected. In another example, a cost value may be weighted by a factor (e.g., the corresponding transform block size) before being used to produce accumulated costs.

In some implementations, the technique 1000 can include using accumulated ranks for neighbor transform blocks to select a scan order instead of accumulated cost values. For example, in place of determining cost values for candidate scan orders for a given transform block, the candidate scan orders available for that given transform block can be ranked according to one or more of the end of block positions, the numbers of zero-value coefficients located before the end of block positions, or the like. For example, a rank can be expressed in numerical form, such as where "1" reflects the best rank and "N" reflects the lowest rank, where N is the number of candidate scan orders in the set of candidate scan orders. The ranks for a given candidate scan order at each neighbor transform block can then be added to produce an accumulated rank for that candidate scan order. The accumulated ranks for each of the candidate scan orders can then be compared. The one of the candidate scan orders selected for the current transform block thus has a lowest one of those accumulated ranks.

In some implementations, the technique 1000 may omit determining the costs for the candidate scan orders for the current transform block. For example, the scan order selected for encoding or decoding the current transform block can be selected based on costs determined for the candidate scan orders for the neighbor transform blocks alone. In such an implementation, the operations for accumulating the costs for the candidate scan orders does not include using costs for the candidate scan orders determined for the current transform block.

In some implementations, cost values may not be available for some candidate scan orders for some of the neighbor transform blocks. For example, a current transform block may have been processed using first, second, and third candidate scan orders (e.g., such that cost values for each of the first, second, and third candidate scan orders were determined for the current transform block). A first neighbor transform block may have been processed using the first and second candidate scan orders, whereas a second neighbor transform block may have been processed using the second and third candidate scan orders. As such, the cost values for the second candidate scan order can be used from the first and second neighbor transform blocks. However, the cost value for the first candidate scan order can only be used from the first neighbor transform block, and the cost value for the third candidate scan order can only be used from the second neighbor transform block.

Figure 11:
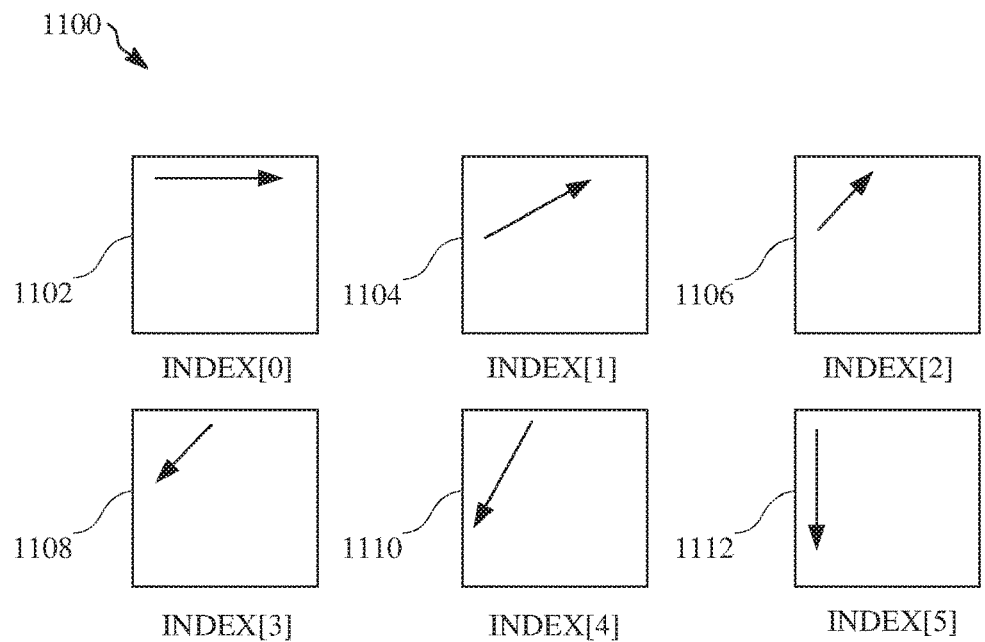
FIG. 11 shows a set of candidate scan orders according to implementations of this disclosure.

FIG. 11 shows a set of candidate scan orders 1100 according to implementations of this disclosure. The set of candidate scan orders includes the candidate scan orders 1102, 1104, 1106, 1108, 1110, and 1112. Each of the candidate scan orders 1102, 1104, 1106, 1108, 1110, and 1112 has a different angle and/or direction for scanning coefficients in a transform block. For example, the candidate scan order 1102 has a horizontal 0 degree angle, the candidate scan order 1104 has a horizontal 22.5 degree angle from bottom-left to top-right, the candidate scan order 1106 has a 45 degree angle from bottom-left to top-right, the candidate scan order 1108 has a 45 degree angle from top-right to bottom-left, the candidate scan order 1110 has a vertical 22.5 degree angle from top-right to bottom-left, and the candidate scan order 1112 has a vertical 0 degree angle.

The set of candidate scan orders 1100 can be represented as an array or other data object including elements referenced by index. For example, the set of candidate scan orders 1100 can be referred to as candidates[x] where x={0, 1, 2, 3, 4, 5}. For example, the candidate scan order 1102 has index[0] and is thus referenced at candidates[0], the candidate scan order 1104 has index[1] and is thus referenced at candidates[1], and so on. The size of the set of candidate scan orders 1100 may in some cases be based on the size of the transform block for which the scan order is being selected. For example, there may be a larger number of candidate scan orders when the transform block is larger.

However, a set of candidate scan orders from which a scan order is selected for encoding or decoding a transform block may be different from the set of candidate scan orders 1100. For example, other scan orders, such as one or more of the scan orders 702, 704, 706, or 708 shown in FIG. 7 may be included in the set of candidate scan orders 1100 in addition to or in place of one or more of the candidate scan orders 1102, 1104, 1106, 1108, 1110, or 1112. In another example, scan orders other than those shown in FIG. 7 or 11 may be included in the set of candidate scan orders, such as in addition to or in place of one or more of the candidate scan orders 1102, 1104, 1106, 1108, 1110, or 1112.

Figure 12:
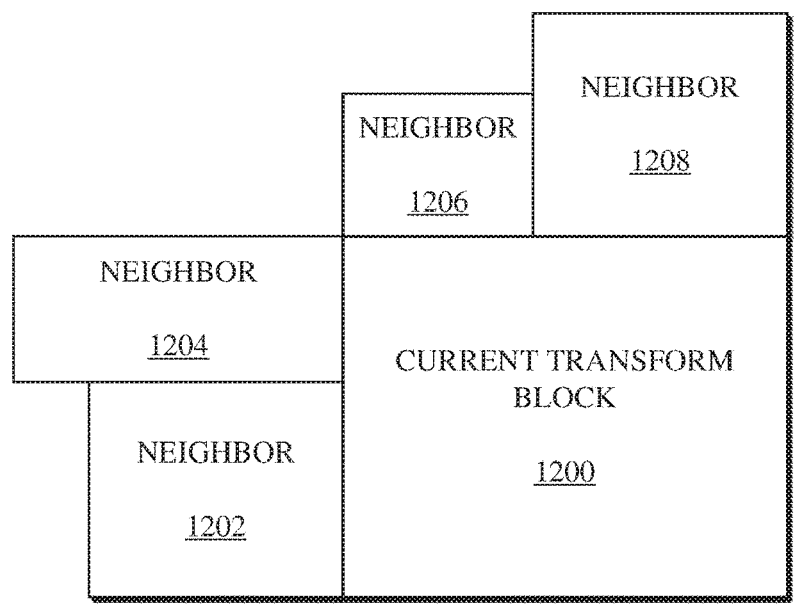
FIG. 12 shows a current transform block and neighbor transform blocks of the current transform block within a video frame according to implementations of this disclosure.

FIG. 12 shows a current transform block 1200 and neighbor transform blocks 1202-1208 of the current transform block 1200 within a video frame according to implementations of this disclosure. Some implementations of this disclosure include selecting a scan order for encoding or decoding a transform block based on cost values determined with respect to a current transform block (e.g., the current transform block 1200) alone. However, other implementations include selecting the scan order based on cost values or ranks from neighbor transform blocks (e.g., the neighbor transform blocks 1202-1208) of such a current transform block. For example, the technique 1000 described above with respect to FIG. 10 can be performed to produce accumulated costs or accumulated ranks based on cost values or ranks determined for individual ones of the neighbor transform blocks 1202-1208, and the candidate scan order to use for the current transform block 1200 can be selected based on those accumulated costs or accumulated ranks. In this way, the neighbor transform blocks 1202-1208 can essentially vote on the candidate scan order to use to encode or decode the current transform block 1200, such as based on the accumulated cost values or accumulated ranks from the neighbor transform blocks 1202-1208.

The aspects of encoding and decoding described above illustrate some examples of encoding and decoding techniques and hardware components configured to perform all or a portion of those examples of encoding and/or decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean a natural inclusive permutation thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware (e.g., the hardware component 1000 and/or the hardware component 1100) can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding a current transform block according to a scan order selected based on transform coefficients of a previously decoded transform block, the method comprising:
   identifying, as a first end of block position, a location within the previously decoded transform block of a last non-zero one of the transform coefficients according to a first candidate scan order;
   identifying, as a second end of block position, a location within the previously decoded transform block of a last non-zero one of the transform coefficients according to a second candidate scan order;
   determining a cost value for the first candidate scan order based on a number of the transform coefficients that are located before the first end of block position;
   determining a cost value for the second candidate scan order based on a number of the transform coefficients that are located before the second end of block position;
   selecting, based on the cost value for the first candidate scan order and the cost value for the second candidate scan order, one of the first candidate scan order or the second candidate scan order as the scan order for decoding the current transform block; and
   decoding the current transform block using the selected scan order.

2. The method of claim 1, wherein identifying the location within the previously decoded transform block of the last non-zero one of the transform coefficients according to the first candidate scan order comprises:
   determining a first number, the first number being the total number of the transform coefficients to be decoded based on the first candidate scan order including non-zero transform coefficients and zero-value transform coefficients.

3. The method of claim 2, wherein determining the cost value for the first candidate scan order based on the number of the transform coefficients that are located before the first end of block position comprises:
   determining a second number, the second number being the total number of non-zero coefficients of the transform coefficients to be decoded based on the first candidate scan order; and
   calculating a difference between the first number and the second number.

4. The method of claim 1, wherein selecting the one of the first candidate scan order or the second candidate scan order as the scan order for decoding the current transform block comprises:
   determining whether the cost value for the first candidate scan order is less than the cost value for the second candidate scan order; and either:
   responsive to determining that the cost value for the first candidate scan order is less than or equal to the cost value for the second candidate scan order, selecting the first candidate scan order as the scan order for decoding the current transform block; or
   responsive to determining that the cost value for the first candidate scan order is greater than the cost value for the second candidate scan order, selecting the second candidate scan order as the scan order for decoding the current transform block.

5. The method of claim 1, wherein the previously decoded transform block is a neighbor transform block of the current transform block, the method further comprising:
   determining other cost values for each of the first candidate scan order and the second candidate scan order based on transform coefficients of one or more other neighbor transform blocks of the transform block.

6. The method of claim 5, wherein:
   the cost value for the first candidate scan order, the cost value for the second candidate scan order, and the other cost values are accumulated to produce accumulated cost values, and
   selecting the one of the first candidate scan order or the second candidate scan order as the scan order for decoding the current transform block comprises:
      determining that the first candidate scan order has a lowest accumulated cost value of the accumulated cost values; and
      selecting the first candidate scan order as the scan order for decoding the current transform block.

7. The method of claim 5, wherein the cost values are ranked and accumulated to produce accumulated ranks, and selecting the one of the first candidate scan order or the second candidate scan order as the scan order for decoding the current transform block comprises:
   determining that the first candidate scan order has a lowest accumulated rank of the accumulated ranks; and
   selecting the first candidate scan order as the scan order for decoding the current transform block.

8. The method of claim 1, wherein:
the first candidate scan order and the second candidate scan order are included in a set of candidate scan orders, and
the set of candidate scan orders is based on a size of the previously decoded transform block.

9. An apparatus for decoding a current transform block according to a scan order selected based on transform coefficients of a previously decoded transform block, the apparatus comprising:
a memory; and
a processor configured to execute instructions stored in the memory to:
identify, as a first end of block position, a location within the previously decoded transform block of a last non-zero one of the transform coefficients according to a first candidate scan order;
identify, as a second end of block position, a location within the previously decoded transform block of a last non-zero one of the transform coefficients according to a second candidate scan order;
determine a cost value for the first candidate scan order based on a number of the transform coefficients that are located before the first end of block position;
determine a cost value for the second candidate scan order based on a number of the transform coefficients that are located before the second end of block position;
select, based on the cost value for the first candidate scan order and the cost value for the second candidate scan order, one of the first candidate scan order or the second candidate scan order as the scan order for decoding the current transform block; and
decode the current transform block using the selected scan order.

10. The apparatus of claim 9, wherein the instructions to identify the location within the previously decoded transform block of the last non-zero one of the transform coefficients according to the first candidate scan order include instructions to:
determine a first number, the first number being the total number of the transform coefficients to be decoded based on the first candidate scan order including non-zero transform coefficients and zero-value transform coefficients.

11. The apparatus of claim 10, wherein the instructions to determine the cost value for the first candidate scan order based on the number of the transform coefficients that are located before the first end of block position include instructions to:
determine a second number, the second number being the total number of non-zero coefficients of the transform coefficients; and
calculate a difference between the first number and the second number.

12. The apparatus of claim 9, wherein the instructions to select the one of the first candidate scan order or the second candidate scan order as the scan order for decoding the current transform block include instructions to:
determine whether the cost value for the first candidate scan order is less than the cost value for the second candidate scan order;
responsive to a determination that the cost value for the first candidate scan order is less than or equal to the cost value for the second candidate scan order, select the first candidate scan order as the scan order for decoding the current transform block; and
responsive to a determination that the cost value for the first candidate scan order is greater than the cost value for the second candidate scan order, select the second candidate scan order as the scan order for decoding the current transform block.

13. The apparatus of claim 9, wherein:
the previously decoded transform block is a neighbor transform block of the current transform block, and
the instructions further include instructions to: determine other cost values for each of the first candidate scan order and the second candidate scan order based on transform coefficients of one or more other neighbor transform blocks of the transform block.

14. The apparatus of claim 13, wherein:
the cost value for the first candidate scan order, the cost value for the second candidate scan order, and the other cost values are accumulated to produce accumulated cost values, and
the instructions to select the one of the first candidate scan order or the second candidate scan order as the scan order for decoding the current transform block include instructions to:
determine that the first candidate scan order has a lowest accumulated cost value of the accumulated cost values; and
select the first candidate scan order as the scan order for decoding the current transform block.

15. The apparatus of claim 13, wherein:
the cost values are ranked and accumulated to produce accumulated ranks, and
the instructions to select the one of the first candidate scan order or the second candidate scan order as the scan order for decoding the current transform block include instructions to:
determine that the first candidate scan order has a lowest accumulated rank of the accumulated ranks; and
select the first candidate scan order as the scan order for decoding the current transform block.

16. The apparatus of claim 9, wherein the first candidate scan order and the second candidate scan order are included in a set of candidate scan orders, wherein the set of candidate scan orders is based on a size of the previously decoded transform block.

17. A method for decoding a current transform block, the method comprising:
identifying a first number of zero-value transform coefficients located before a last non-zero coefficient of a previously decoded transform block according to a first candidate scan order;
identifying a second number of zero-value transform coefficients located before a last non-zero coefficient of the previously decoded transform block according to a second candidate scan order;
determining that the first number of zero-value transform coefficients is less than the second number of zero-value transform coefficients; and
responsive to determining that the first number of zero-value transform coefficients is less than the second number of zero-value transform coefficients, decoding the current transform block using the first candidate scan order.

18. The method of claim 17, wherein the previously decoded transform block is a neighbor transform block of the current transform block, the method further comprising:
identifying other numbers of zero-value transform coefficients located before a last non-zero coefficient of one or more other neighbor transform blocks of the current transform block according to each of the first candidate scan order and the second candidate scan order.

19. The method of claim 18, wherein:
the first number of zero-value transform coefficients, the second number of zero-value transform coefficients, and the other numbers of zero-value transform coefficients are accumulated to produce accumulated cost values, and determining that the first number of zero-value transform coefficients is less than the second number of zero-value transform coefficients comprises determining that the first candidate scan order has a lowest accumulated cost value of the accumulated cost values.

20. The method of claim 18, wherein:
the first number of zero-value transform coefficients, the second number of zero-value transform coefficients, and the other numbers of zero-value transform coefficients are ranked and accumulated to produce accumulated ranks, and determining that the first number of zero-value transform coefficients is less than the second number of zero-value transform coefficients comprises determining that the first candidate scan order has a lowest accumulated rank of the accumulated ranks.

* * * * *